(12) United States Patent
Kim

(10) Patent No.: US 9,743,226 B2
(45) Date of Patent: Aug. 22, 2017

(54) METHOD FOR SHORT-RANGE WIRELESS COMMUNICATION AND ELECTRONIC DEVICE USING THE SAME

(71) Applicant: Samsung Electronics Co., Ltd., Gyeonggi-do (KR)

(72) Inventor: Namjin Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/143,213

(22) Filed: Apr. 29, 2016

(65) Prior Publication Data

US 2016/0323699 A1 Nov. 3, 2016

(30) Foreign Application Priority Data

Apr. 30, 2015 (KR) .................. 10-2015-0061998

(51) Int. Cl.
*H04B 7/00* (2006.01)
*H04W 4/00* (2009.01)
*H04W 76/02* (2009.01)
*H04M 1/60* (2006.01)
*H04M 1/00* (2006.01)
*H04M 1/725* (2006.01)

(52) U.S. Cl.
CPC .......... *H04W 4/008* (2013.01); *H04M 1/006* (2013.01); *H04M 1/6066* (2013.01); *H04M 1/7253* (2013.01); *H04W 76/02* (2013.01); *H04M 2250/02* (2013.01)

(58) Field of Classification Search
CPC ..... H04W 76/02; H04W 88/04; H04W 4/008; H04M 1/2535; H04M 1/6066
USPC ........................................ 455/41.2
See application file for complete search history.

(56) References Cited

U.S. PATENT DOCUMENTS

| 7,363,006 | B2 | 4/2008 | Mooney |
| 2006/0146774 | A1 | 7/2006 | Kim et al. |
| 2009/0233550 | A1 | 9/2009 | Ryu |
| 2010/0159830 | A1 | 6/2010 | Findlay et al. |
| 2013/0012128 | A1 | 1/2013 | Kim |

OTHER PUBLICATIONS

Extended European Search Report dated Oct. 7, 2016 in connection with European Application No. 16167757.0, 8 pages.

*Primary Examiner* — Eugene Yun

(57) ABSTRACT

A method for short-range wireless communication for an electronic device is provided, which comprises establishing a first connection to a first electronic device; transmitting audio data on a call received by the electronic device to the first electronic device based on the first connection; and receiving audio data on a call received by the first electronic device based on a second connection in a state where the electronic device and the first electronic device are connected through the first connection.

20 Claims, 12 Drawing Sheets

METHOD FOR SHORT-RANGE WIRELESS COMMUNICATION AND ELECTRONIC DEVICE USING THE SAME

CROSS-REFERENCE TO RELATED APPLICATION AND CLAIM OF PRIORITY

The present application is related to and claims the priority benefit under 35 U.S.C. §119(a) of Korean patent application no. 10-2015-0061998, filed on Apr. 30, 2015, which is hereby incorporated by reference for all purposes as if fully set forth herein.

TECHNICAL FIELD

The present disclosure relates to a method for short-range wireless communication and an electronic device using the same.

BACKGROUND

Recently, an electronic device such as a portable terminal may be connected to another electronic device such as a wearable device using hands-free function that adopts short-range wireless communication (e.g., Bluetooth). Accordingly, the wearable device can receive a phone call from the portable terminal using the hands-free function, and thus a user of the portable terminal can talk on the phone more conveniently.

SUMMARY

To address the above-discussed deficiencies, it is a primary object to provide an electronic device such as a portable terminal which may play a role of an Audio Gateway (AG) in the case where it is connected to another electronic device using short-range wireless communication (e.g., Bluetooth), while a simple electronic device such as a headset may play a role of a Hands-Free unit (HF) in the case where it is connected to another electronic device using short-range wireless communication (e.g., Bluetooth). For example, the portable terminal that serves as the AG and the headset that serves as the HF may make Hands-Free Profile (HFP) connection to each other, and based on this, a Synchronous Connection Oriented (SCO) link for a voice call may be connected between them. On the other hand, in the case where an electronic device such as a wearable device carries a 3G/4G function, the wearable device may play the roles of both the AG and the HF.

In various embodiments of the present disclosure, an electronic device such as a portable terminal may play not only an AG role but also an HF role. That is, in the case where the wearable device plays the AG role, the portable terminal may play the HF role to be simply used as the HF. Accordingly, in the case where the wearable device receives a phone call, the user can talk on the phone through the portable terminal that makes short-range wireless connection to the wearable device, and thus inconvenience that is caused when the user talks on the phone through the wearable device can be reduced.

In accordance with an aspect of the present disclosure, a method for short-range wireless communication for an electronic device includes making a first connection to a first electronic device; transmitting audio data on a call received by the electronic device to the first electronic device on the basis of the first connection; and the electronic device receiving the audio data on the call received by the first electronic device on the basis of a second connection in a state where the electronic device and the first electronic device are connected through the first connection.

In accordance with another aspect of the present disclosure, an electronic device includes a communication module; an AG service module; a HFP service module; a processor electrically connected to the communication module, the AG service module, and the HFP service module; and a memory, wherein the memory, when executed, stores instructions to cause the electronic device to make a first connection to a first electronic device, to transmit audio data on a call received by the electronic device to the first electronic device on the basis of the first connection, and to receive the audio data on the call received by the first electronic device on the basis of a second connection in a state where the electronic device and the first electronic device are connected through the first connection.

According to various embodiments disclosed in the description, an electronic device such as a portable terminal can perform not only an AG role but also an HF role. That is, in the case where a wearable device plays the AG role, the portable terminal can play the HF role, and thus the portable terminal can be used as a simple hands-free device. Accordingly, in the case where the wearable device receives a phone call, the user can talk on the phone through the portable terminal that makes short-range wireless connection to the wearable device, and thus inconvenience that is caused when the user talks on the phone through the wearable device can be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
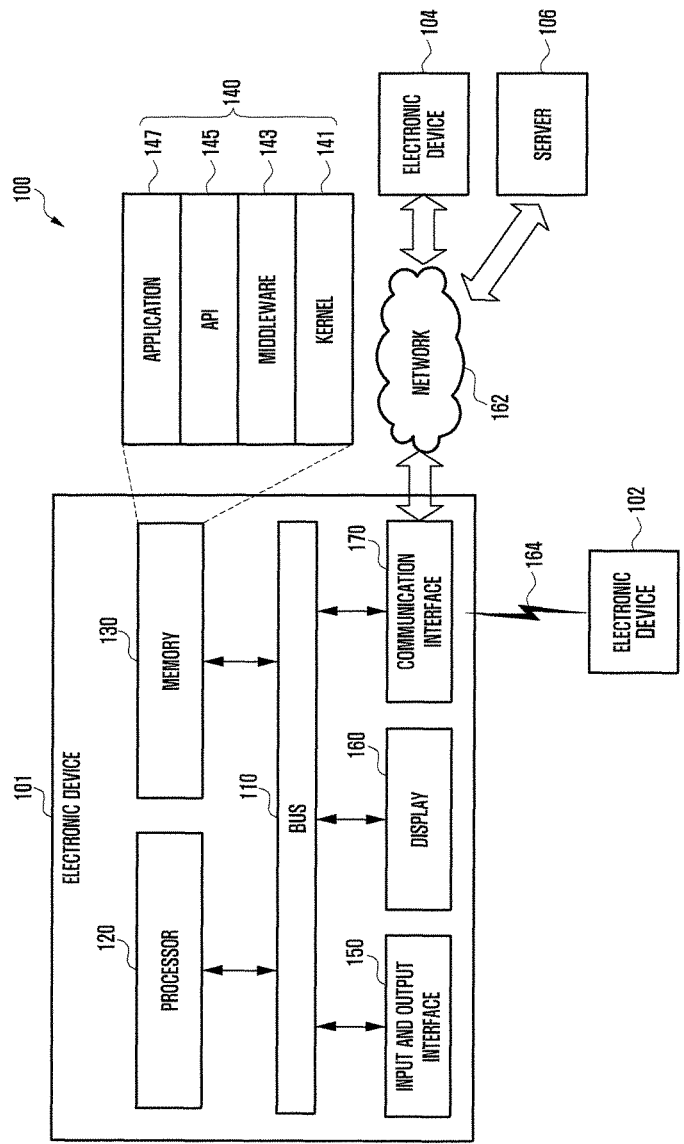
FIG. 1 illustrates a network environment including an electronic device according to various embodiments of the present disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples only and not to be considered as a limitation of this disclosure.

FIG. 1 illustrates an electronic apparatus according to an embodiment of the present disclosure.

Referring to FIG. 1, the electronic device 101 may include a bus 110, a processor 120, a memory 130, a user input module 150, a display 160, and a communication interface 170.

The bus 110 may be a circuit for interconnecting elements described above and for allowing a communication, e.g. by transferring a control message, between the elements described above.

The processor 120 can receive commands from the above-mentioned other elements, e.g. the memory 130, the user input module 150, the display 160, and the communication interface 170, through, for example, the bus 110, can decipher the received commands, and perform operations and/or data processing according to the deciphered commands.

The memory 130 can store commands received from the processor 120 and/or other elements, e.g. the user input module 150, the display 160, and the communication interface 170, and/or commands and/or data generated by the processor 120 and/or other elements. The memory 130 may include software and/or programs 140, such as a kernel 141, middleware 143, an Application Programming Interface (API) 145, and an application 147. Each of the programming modules described above may be configured by software, firmware, hardware, and/or combinations of two or more thereof.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 100 and another electronic devices 102 and 104 and/or a server 164. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
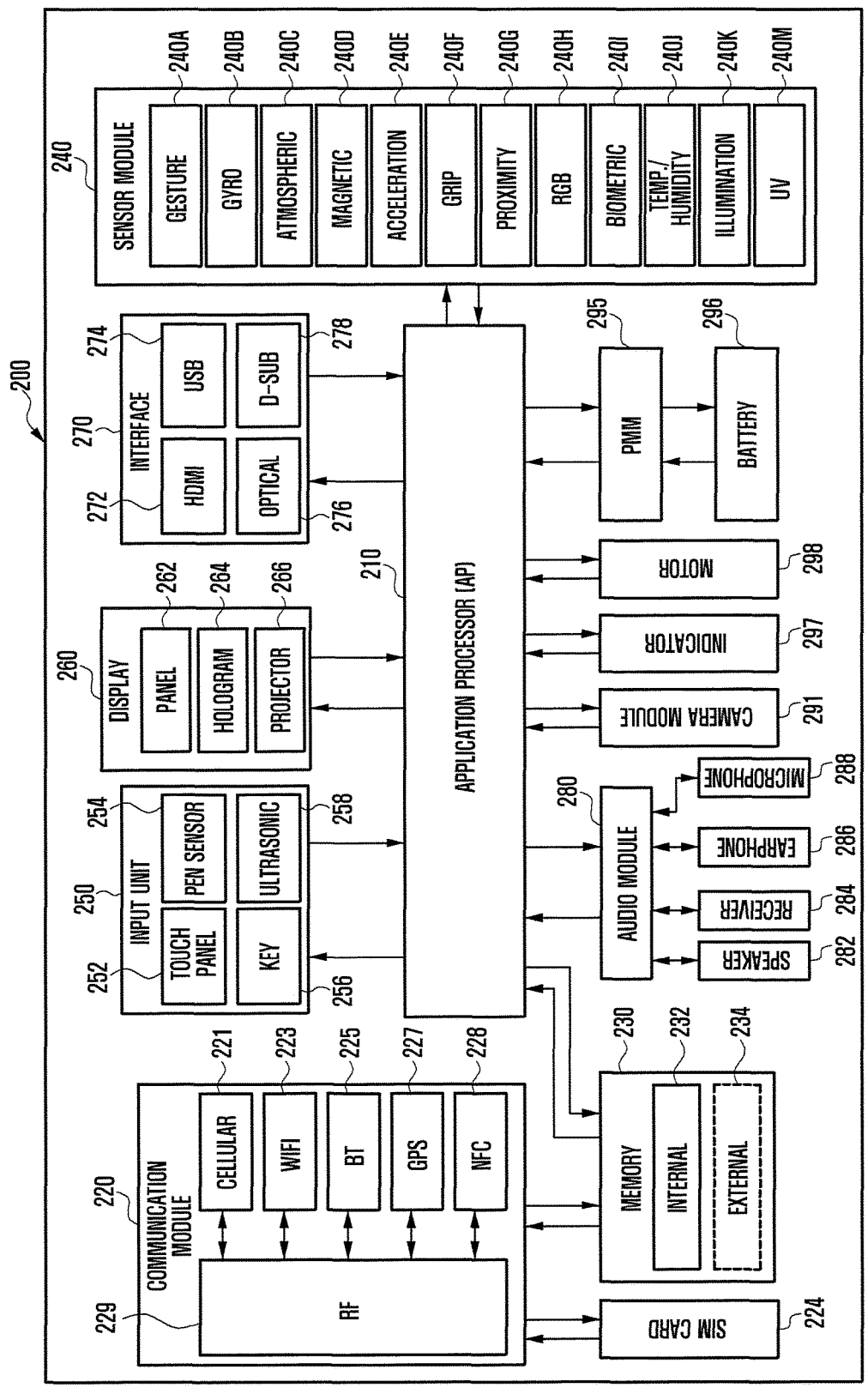
FIG. 2 illustrates an electronic device according to various embodiments of the present disclosure.

FIG. 2 illustrates an electronic device 201 in accordance with an embodiment of the present disclosure. The electronic device 201 may form, for example, the whole or part of the electronic device 101 shown in FIG. 1. Referring to FIG. 2, the electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 170) may perform a data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 160) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the user input module 150 (e.g., input/output interface) shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device.

Figure 3:
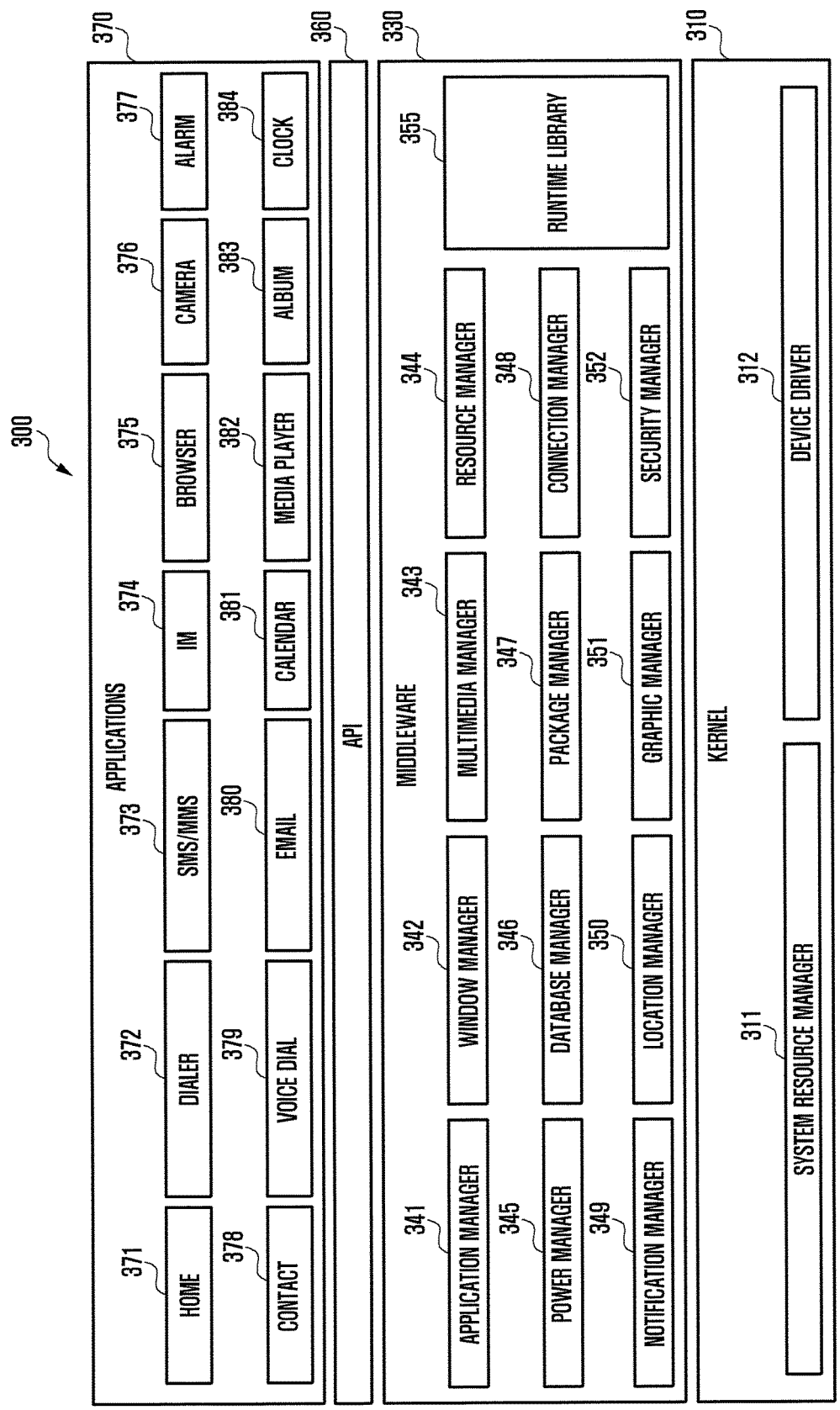
FIG. 3 illustrates a program module according to various embodiments of the present disclosure.

FIG. 3 illustrates a configuration of a programming module 300 according to an embodiment of the present disclosure.

The programming module 300 may be included (or stored) in the electronic device 100 (e.g., the memory 130) or may be included (or stored) in the electronic device 200 (e.g., the memory 230) illustrated in FIG. 1. At least a part of the programming module 300 may be implemented in software, firmware, hardware, or a combination of two or more thereof. The programming module 300 may be implemented in hardware (e.g., the hardware of the electronic device 200), and may include an OS controlling resources related to an electronic device (e.g., the electronic device 100) and/or various applications (e.g., an application 370) executed in the OS. For example, the OS may be Android, iOS, Windows, Symbian, Tizen, Bada, and the like.

Referring to FIG. 3, the programming module 300 may include a kernel 310, a middleware 330, an API 360, and/or the application 370.

The kernel 310 (e.g., the kernel 131) may include a system resource manager 311 and/or a device driver 312. The system resource manager 311 may include, for example, a process manager (not illustrated), a memory manager (not illustrated), and a file system manager (not illustrated). The system resource manager 311 may perform the control, allocation, recovery, and/or the like of system resources. The device driver 312 may include, for example, a display driver (not illustrated), a camera driver (not illustrated), a Bluetooth driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an Inter-Process Communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a Basic Input/Output System (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, Wi-Fi and Bluetooth. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a Short Message Service (SMS)/Multimedia Message Service (MMS) application 373, an Instant Message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 300 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 300 may be implemented (e.g., executed) by, for example, the one or more processors 210. At least a part of the programming module 300 may include, for example, a module, a program, a routine, a set of instructions, and/or a process for performing one or more functions.

Figure 4:
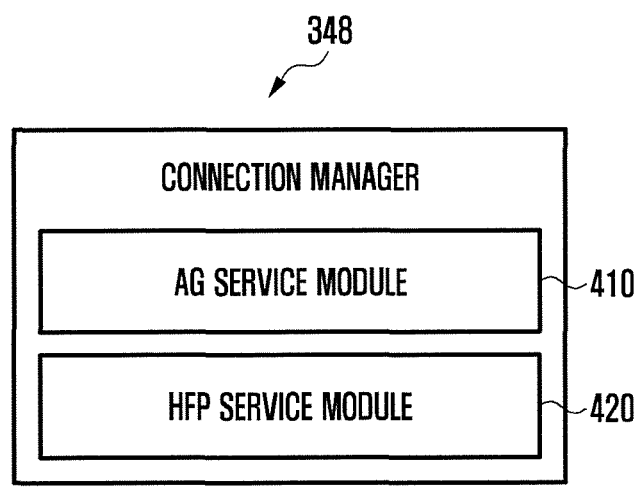
FIG. 4 illustrates the configuration of a connection manager of an electronic device according to various embodiments of the present disclosure.

FIG. 4 illustrates the configuration of a connection manager of an electronic device according to various embodiments of the present disclosure.

Referring to FIG. 4, according to various embodiments of the present disclosure, a connection manager 348 may include an AG service module 410 and a HFP service module 420. For example, the connection manager 348 may mean middleware that manages wireless connection, such as Bluetooth.

According to various embodiments of the present disclosure, the AG service module 410 may play an Audio Gateway (AG) role in the case where an electronic device 101 makes short-range wireless connection to another electronic device 102. Here, the AG role may mean a gateway role of an audio signal that comes from an outside to the electronic device 101 and an audio signal that comes from the electronic device 102 that makes short-range wireless connection to the electronic device 101.

According to various embodiments of the present disclosure, the HFP service module 420 may play a Hands-Free unit (HF) role in the case where the electronic device 101 makes the short-range wireless connection (e.g., Bluetooth) to the other electronic device 102. Here, the electronic device 101 that plays the HF role may make Hands-Free Profile (HFP) connection through the short-range wireless connection (e.g., Bluetooth) to correspond to the other electronic device 102 that plays the AG role.

According to various embodiments of the present disclosure, the connection manager 348 of the electronic device 101 may make the HFP connection to the other electronic device 102 that plays the HF role using the AG service module 410. Further, the connection manager 348 may be connected to the other electronic device 102 through a Synchronous Connection Oriented (SCO) link in the case where the electronic device 101 and the other electronic device 102 make the HFP connection to each other. The electronic device 101 may transmit/receive data on a voice call using the SCO link.

According to various embodiments of the present disclosure, the connection manager 348 of the electronic device 101 may make the HFP connection to the other electronic device 102 that plays the AG role using the HFP service module 420. Further, the connection manager 348 may be connected to the other electronic device 102 through a Synchronous Connection Oriented (SCO) link in the case where the electronic device 101 and the other electronic device 102 make the HFP connection to each other. The electronic device 101 may transmit/receive data related to a voice call using the SCO link.

The electronic device according to various embodiments of the present disclosure may include a communication module, an AG service module, a HFP service module, a processor electrically connected to the communication module, the AG service module, and the HFP service module, and a memory, wherein the memory, when executed, stores instructions to cause the electronic device to make a first connection to a first electronic device, to transmit audio data on a call received by the electronic device to the first electronic device on the basis of the first connection, and to receive the audio data on the call received by the first electronic device on the basis of a second connection in a state where the electronic device and the first electronic device are connected through the first connection.

The first connection and the second connection may be short-range wireless communication connection, such as Bluetooth (BT).

The memory, when executed, may store instructions to cause the electronic device to make a first Hands-Free Profile (HFP) connection using the Audio Gateway (AG) of the electronic device and the Hands-Free unit (HF) of the first electronic device in the case where the electronic device makes the first connection.

The memory, when executed, may store instructions to cause the electronic device to make a second Hands-Free Profile (HFP) connection using the Hands-Free unit (HF) of the electronic device and the Audio Gateway (AG) of the first electronic device in the case where the electronic device makes the second connection.

The memory, when executed, may store instructions to cause the electronic device to connect to a first Synchronous Connection Oriented (SCO) link on the basis of the first HFP connection and to transmit audio data on the call received by the electronic device to the first electronic device through the first SCO link in the case where the electronic device transmits the audio data on the call received by the electronic device to the first electronic device on the basis of the first connection.

The memory, when executed, may store instructions to cause the electronic device to end the connection of the first SCO link, to connect to a second SCO link on the basis of the second HFP connection, and to receive the audio data on the call received by the first electronic device from the first electronic device through the second SCO link in the case where the electronic device receives the audio data on the call received by the first electronic device on the basis of the second connection.

The memory, when executed, may store instructions to cause the electronic device to make a third connection to a second electronic device, and to transmit the audio data on the call received by the electronic device to the second electronic device on the basis of the third connection while the electronic device receives the audio data on the call received by the first electronic device on the basis of the second connection.

The memory, when executed, may store instructions to cause the electronic device to make a second Hands-Free Profile (HFP) connection using the Hands-Free unit (HF) of the electronic device and the Audio Gateway (AG) of the first electronic device in the case where the electronic device makes the second connection, and to make a third Hands-Free Profile (HFP) connection using the Audio Gateway (AG) of the electronic device and the Hands-Free unit (HF) of the second electronic device in the case where the electronic device makes the third connection.

The memory, when executed, may store instructions to cause the electronic device to connect to a second SCO link on the basis of the second HFP connection and to receive the audio data on the call received by the first electronic device from the first electronic device through the second SCO link in the case where the electronic device receives the audio data on the call received by the first electronic device from the first electronic device on the basis of the second connection.

The memory, when executed, may store instructions to cause the electronic device to end the connection of the second SCO link, to connect to a third Synchronous Connection Oriented (SCO) link on the basis of the third HFP connection, and to transmit the audio data on the call received by the electronic device to the second electronic device through the third SCO link in the case where the electronic device transmits the audio data on the call received by the electronic device to the third electronic device while receiving the audio data on the call received by the first electronic device from the first electronic device.

Figure 5:
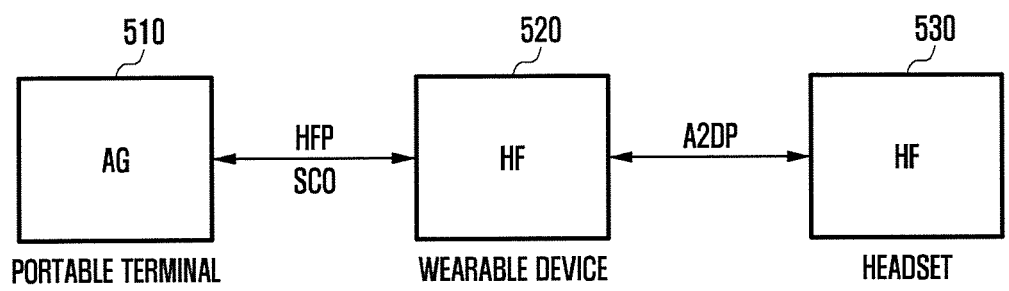
FIG. 5 illustrates short-range wireless connection between an electronic device that serves as an AG and an electronic device that serves as an HF according to various embodiments of the present disclosure.

FIG. 5 illustrates short-range wireless connection between an electronic device (e.g., portable terminal) that serves as an AG only and electronic devices (e.g., wearable device and headset) that serve as an HF only according to various embodiments of the present disclosure.

Referring to FIG. 5, according to various embodiments of the present disclosure, a portable terminal 510 may serve as an AG only, and a wearable device 520 and a headset 530 may serve as an HF only. That is, only an AG service module may exist in the portable terminal 510, and only a HFP service module may exist in the wearable device 520 and the headset 530.

According to various embodiments of the present disclosure, the portable terminal 510 may make the HFP connection to the wearable device 520. Further, the portable terminal 510 may connect to the SCO link through which the data on the voice call can be transmitted or received on the basis of the HFP connection. Here, the portable terminal 510 that serves as the AG may be a mother terminal, and the wearable device 520 that serves as the HF may be a child terminal. For example, the portable terminal 510 may receive a call connection request from a base station. The portable terminal 510 may transmit a call acceptance notification to the HFP-connected wearable device 520. If the wearable device 520 accepts the call connection request, the portable terminal 510 and the wearable device 520 may be connected to each other through the SCO link to make a voice call.

According to various embodiments of the present disclosure, the wearable device 520 may make Advanced Audio Distribution Profile (A2DP) connection to the headset 530. That is, since the wearable device 520 is unable to serve as the AG, it is unable to make the HFP connection to the headset that serves as the HF. Accordingly, the wearable device 520 is unable to support the voice call through the SCO link, but is able to support sound source reproduction, such as MP3.

Figure 6:
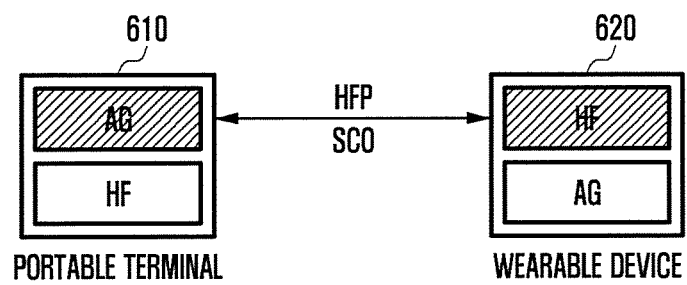
FIG. 6 illustrates short-range wireless connection of an electronic device that serves as both an AG and an HF according to various embodiments of the present disclosure.

FIG. 6 illustrates short-range wireless connection of an electronic device that serves as both an AG and an HF according to various embodiments of the present disclosure.

Referring to FIG. 6, according to various embodiments of the present disclosure, a portable terminal 610 and a wearable device 620 can serve as both an AG and an HF. That is, both an AG service module and a HFP service module may exist in the portable terminal 610 and the wearable device 620.

According to various embodiments of the present disclosure, the portable terminal 610 may make the HFP connection to the wearable device 620. Further, the portable terminal 610 may connect to the SCO link through which the data on the voice call can be transmitted or received on the basis of the HFP connection.

According to various embodiments of the present disclosure, the portable terminal 610 that serves as the AG may be a mother terminal, and the wearable device 620 that serves as the HF may be a child terminal. For example, the portable terminal 610 may receive a call connection request from a base station. The portable terminal 610 may transmit a call acceptance notification to the HFP-connected wearable device 620. If the wearable device 620 accepts the call connection request, the portable terminal 610 and the wearable device 620 may connect to the SCO link to make a voice call. Accordingly, the wearable device 620 may operate as a hands-free device of the portable terminal 610.

According to various embodiments of the present disclosure, the portable terminal 610 that serves as the HF may be a child terminal, and the wearable device 620 that serves as the AG may be a mother terminal. For example, the wearable device 620 may receive a call connection request from a base station. The wearable device 620 may transmit a call acceptance notification to the HFP-connected portable terminal 610. If the portable terminal 610 accepts the call connection request, the portable terminal 610 and the wearable device 620 may connect to the SCO link to make a voice call. Accordingly, the portable terminal 610 may operate as a hands-free device of the wearable device 620.

Figure 7A:
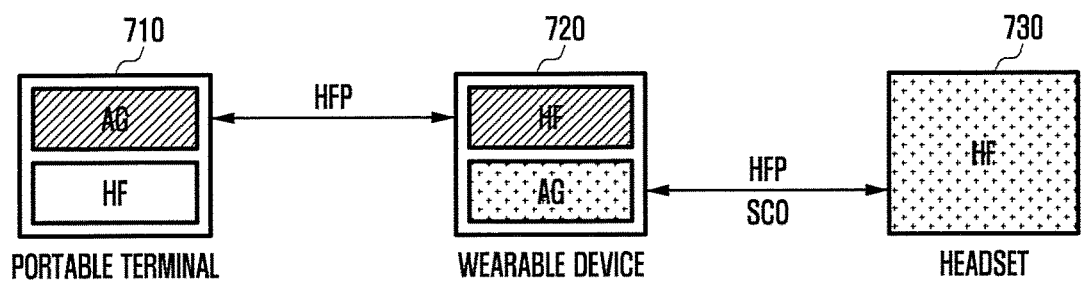
FIG. 7A illustrates a method for performing a voice call through a headset in a state where a wearable device becomes a mother terminal according to various embodiments of the present disclosure.

FIG. 7A illustrates a method for performing a voice call through a headset in a state where a wearable device becomes a mother terminal according to various embodiments of the present disclosure.

Referring to FIG. 7A, an AG service module of a portable terminal 710 and a HFP service module of a wearable device 720 may make a first HFP connection to each other. Further, an AG service module of the wearable device 720 and a HFP service module of a headset 730 may make a second HFP connection to each other. That is, since each of the portable terminal 710 and the wearable device 720 has both the AG service module and the HFP service module, they can make different HFP connections.

According to various embodiments of the present disclosure, the wearable device 720 may be connected to the headset 730 through a SCO link on the basis of the second HFP connection. Here, the wearable device 720 that serves as the AG may be a mother terminal, and the headset 730 that serves as the HF may be a child terminal. The wearable device 720 and the headset 730 may transmit/receive data on a voice call using the connection of the SCO link.

Figure 7B:
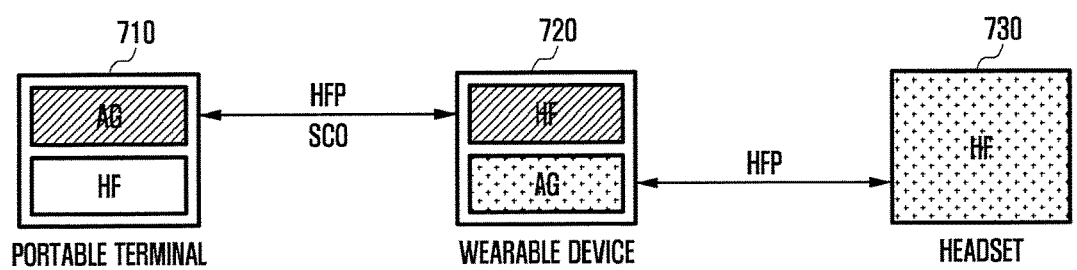
FIG. 7B illustrates a method for performing a voice call through a wearable device in a state where a portable terminal becomes a mother terminal according to various embodiments of the present disclosure.

FIG. 7B illustrates a method for performing a voice call through a wearable device in a state where a portable terminal becomes a mother terminal according to various embodiments of the present disclosure.

Referring to FIG. 7B, an AG service module of a portable terminal 710 and a HFP service module of a wearable device 720 may make a first HFP connection to each other. Further, an AG service module of the wearable device 720 and a HFP service module of a headset 730 may make a second HFP connection to each other. That is, since each of the portable terminal 710 and the wearable device 720 has both the AG service module and the HFP service module, they can make different HFP connections.

According to various embodiments of the present disclosure, the wearable device 720 that operates as a mother terminal as shown in FIG. 7A may operate as a child terminal. For example, while making a voice call using the headset 730, the wearable device 720 may receive a notification of a call connection request from the portable terminal 710. If the wearable device 720 accepts the call connection request, the SCO link to the headset 730 through the second HFP connection may be disconnected, and the SCO link to the portable terminal 710 through the first HFP connection may be connected. Here, the portable ten final 710 that serves as the AG may be a mother terminal, and the wearable device 720 that serves as the HF may be a child terminal. The portable terminal 710 and the wearable device 720 may transmit/receive data on the voice call using the connection of the SCO link.

According to various embodiments of the present disclosure, the wearable device 720 that operates as a mother terminal as shown in FIG. 7A may continuously operate as the mother terminal. For example, while making a voice call using the headset 730, the wearable device 720 may receive a notification of a call connection request from the portable terminal 710. If the wearable device 720 does not accept the call connection request, the SCO link to the headset 730 through the second HFP may be continuously maintained. Accordingly, the wearable device 720 may continuously make a voice call through the headset 730.

Figure 8A:
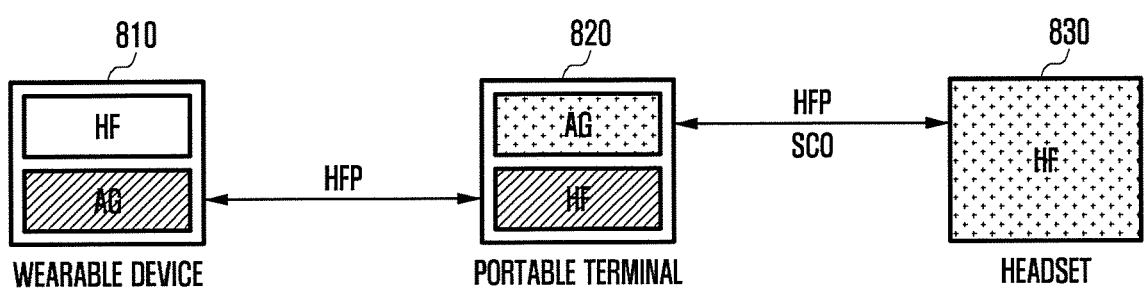
FIG. 8A illustrates a method for performing a voice call through a headset in a state where a portable terminal becomes a mother terminal according to various embodiments of the present disclosure.

FIG. 8A illustrates a method for performing a voice call through a headset in a state where a portable terminal becomes a mother terminal according to various embodiments of the present disclosure.

Referring to FIG. 8A, an AG service module of a wearable device 810 and a HFP service module of a portable terminal 820 may make a first HFP connection to each other. Further, an AG service module of the portable terminal 820 and a HFP service module of a headset 830 may make a second HFP connection to each other. That is, since each of the wearable device 810 and the portable terminal 820 has both the AG service module and the HFP service module, they can make different HFP connections.

According to various embodiments of the present disclosure, the portable terminal 820 may be connected to the headset 830 through a SCO link on the basis of the second HFP connection. Here, the portable terminal 820 that serves as the AG may be a mother terminal, and the headset 830 that serves as the HF may be a child terminal. The portable terminal 820 and the head set 830 may transmit/receive data on a voice call using the connection of the SCO link.

Figure 8B:
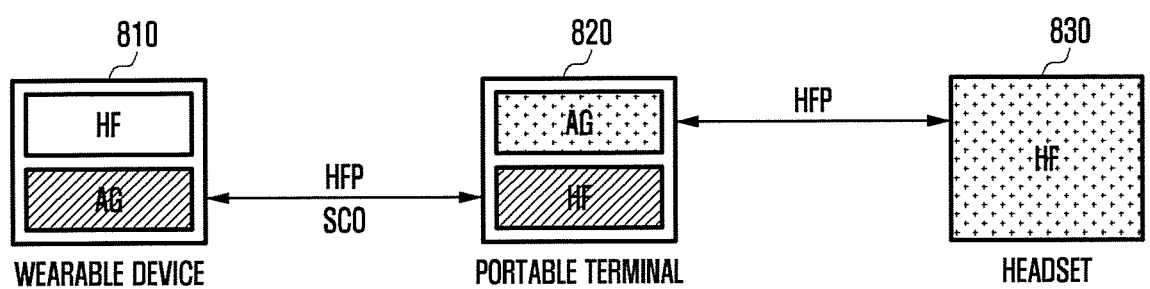
FIG. 8B illustrates a method for performing a voice call through a portable terminal in a state where a wearable device becomes a mother terminal according to various embodiments of the present disclosure.

FIG. 8B illustrates a method for performing a voice call through a portable terminal in a state where a wearable device becomes a mother terminal according to various embodiments of the present disclosure.

Referring to FIG. 8B, an AG service module of a wearable device 810 and a HFP service module of a portable terminal 820 may make a first HFP connection to each other. Further, an AG service module of the portable terminal 820 and a HFP service module of a headset 830 may make a second HFP connection to each other. That is, since each of the wearable device 810 and the portable terminal 820 has both the AG service module and the HFP service module, they can make different HFP connections.

According to various embodiments of the present disclosure, the portable terminal 820 that operates as a mother terminal as shown in FIG. 8A may operate as a child terminal. For example, while making a voice call using the headset 830, the portable terminal 820 may receive a notification of a call connection request from the wearable device 810. If the portable terminal 820 accepts the call connection request, the SCO link to the headset 830 through the second HFP connection may be disconnected, and the SCO link to the wearable device 810 through the first HFP connection may be connected. Here, the wearable device 810 that serves as the AG may be a mother terminal, and the portable terminal 820 that serves as the HF may be a child terminal. The wearable device 810 and the portable terminal 820 may transmit/receive data on the voice call using the connection of the SCO link.

According to various embodiments of the present disclosure, the portable terminal 820 that operates as a mother terminal as shown in FIG. 8A may continuously operate as the mother terminal. For example, while making a voice call using the headset 830, the portable terminal 820 may receive a notification of a call connection request from the wearable device 810. If the portable terminal 820 does not accept the call connection request, the SCO link to the headset 830 through the second HFP connection may be continuously maintained. Accordingly, the portable terminal 820 may continuously make a voice call through the headset 830.

Figure 9A:
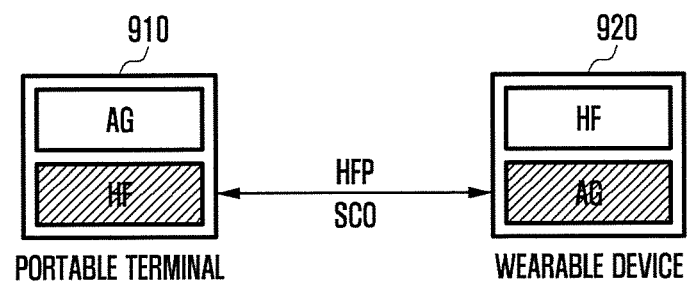
FIG. 9A illustrates a method for connecting a SCO link between a portable terminal and a wearable device in a state where a SIM is not inserted into the portable terminal according to various embodiments of the present disclosure.

FIG. 9A illustrates a method for connecting a SCO link between a portable terminal and a wearable device in a state where a SIM card is not inserted into the portable terminal according to various embodiments of the present disclosure.

Referring to FIG. 9A, according to various embodiments of the present disclosure, if a Subscriber Identity Module (SIM) card 224 is not inserted into a portable terminal 910, the portable terminal 910 is unable to receive an audio signal that is transmitted from an external base station, and thus the portable terminal 910 is unable to serve as the AG. Accordingly, the portable terminal 910 can serve as the HF only, and can make HFP connection to a wearable device 920 that serves as the AG to make a voice call through the SCO link.

Figure 9B:
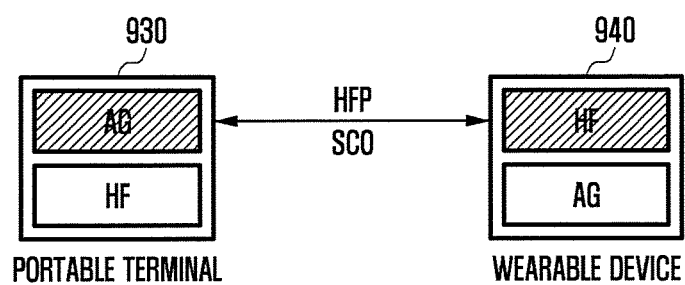
FIG. 9B illustrates a method for connecting a SCO link between a portable terminal and a wearable device in a state where a SIM is not inserted into the wearable device according to various embodiments of the present disclosure.

FIG. 9B illustrates a method for connecting a SCO link between a portable terminal and a wearable device in a state where a SIM is not inserted into the wearable device according to various embodiments of the present disclosure.

Referring to FIG. 9B, according to various embodiments of the present disclosure, if a Subscriber Identity Module (SIM) card 224 is not inserted into a wearable device 940, the wearable device 940 is unable to receive an audio signal that is transmitted from an external base station, and thus the wearable device 940 is unable to serve as the AG. Accordingly, the wearable device 940 can serve as the HF only, and can make HFP connection to a portable terminal 930 that serves as the AG to make a voice call through the SCO link.

According to various embodiments of the present disclosure, a method for short-range wireless communication for an electronic device may include making a first connection to a first electronic device; transmitting audio data on a call received by the electronic device to the first electronic device on the basis of the first connection; and the electronic device receiving the audio data on the call received by the first electronic device on the basis of a second connection in a state where the electronic device and the first electronic device are connected through the first connection.

The first connection and the second connection may be short-range wireless communication connection, such as Bluetooth (BT).

The making the first connection may include making a first Hands-Free Profile (HFP) connection using an Audio Gateway (AG) of the electronic device and a Hands-Free unit (HF) of the first electronic device.

The making the second connection may include making a second Hands-Free Profile (HFP) connection using a Hands-Free unit (HF) of the electronic device and an Audio Gateway (AG) of the first electronic device.

The transmitting the audio data on the call received by the electronic device to the first electronic device on the basis of the first connection may include connecting to a first Synchronous Connection Oriented (SCO) link on the basis of the first HFP connection; and transmitting the audio data on the call received by the electronic device to the first electronic device through the first SCO link.

The electronic device receiving the audio data on the call received by the first electronic device on the basis of the second connection may include ending the connection of the first SCO link; connecting to a second SCO link on the basis of the second HFP connection; and receiving the audio data on the call received by the first electronic device from the first electronic device through the second SCO link.

The method may further include making a third connection to a second electronic device; and transmitting the audio data on the call received by the electronic device to the second electronic device on the basis of the third connection while the electronic device receives the audio data on the call received by the first electronic device on the basis of the second connection.

The making the second connection may include making a second Hands-Free Profile (HFP) connection using the Hands-Free unit (HF) of the electronic device and the Audio Gateway (AG) of the first electronic device, and the making the third connection may include making a third Hands-Free Profile (HFP) connection using the Audio Gateway (AG) of the electronic device and the Hands-Free unit (HF) of the second electronic device.

The receiving the audio data on the call received by the first electronic device from the first electronic device on the basis of the second connection may include connecting to a second SCO link on the basis of the second HFP connection; and receiving the audio data on the call received by the first electronic device from the first electronic device through the second SCO link.

The transmitting the audio data on the call received by the electronic device to the third electronic device while receiving the audio data on the call received by the first electronic device from the first electronic device may include ending the connection of the second SCO link; connecting to a third Synchronous Connection Oriented (SCO) link on the basis of the third HFP connection; and transmitting the audio data on the call received by the electronic device to the second electronic device through the third SCO link.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an Application-Specific Integrated Circuit (ASIC) chip, a Field-Programmable Gate Array (FPGA), and a programmable-logic device for performing certain operations.

Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

Although the present disclosure has been described with embodiments, various changes and modifications may be suggested to one skilled in the art. It is intended that the present disclosure encompass such changes and modifications as fall within the scope of the appended claims.

What is claimed is:

1. A method for short-range wireless communication for an electronic device, the method comprising:
  establishing a first connection to a first electronic device;
  transmitting audio data on a call received based on a first call connection request from a first base station, by the electronic device to the first electronic device based on the first connection; and receiving, by the electronic device, audio data on a call received, based on a second call connection request from a second base station, by the first electronic device based on a second connection in a state where the electronic device and the first electronic device are connected through the first connection.

2. The method of claim 1, wherein the first connection and the second connection are short-range wireless communication connections.

3. The method of claim 1, wherein the establishing of the first connection comprises establishing a first Hands-Free Profile (HFP) connection using an Audio Gateway (AG) of the electronic device and a Hands-Free unit (HF) of the first electronic device.

4. The method of claim 3, wherein the second connection comprises a second Hands-Free Profile (HFP) connection using a Hands-Free unit (HF) of the electronic device and an Audio Gateway (AG) of the first electronic device.

5. The method of claim 4, wherein the transmitting of the audio data on the call received by the electronic device to the first electronic device based on the first connection comprises:
connecting to a first Synchronous Connection Oriented (SCO) link based on the first HFP connection; and
transmitting the audio data on the call received by the electronic device to the first electronic device through the first SCO link.

6. The method of claim 5, wherein the electronic device receiving the audio data on the call received by the first electronic device based on the second connection comprises:
terminating the connection of the first SCO link;
connecting to a second SCO link based on the second HFP connection; and
receiving the audio data on the call received by the first electronic device from the first electronic device through the second SCO link.

7. The method of claim 1, further comprising:
establishing a third connection to a second electronic device; and
transmitting the audio data on the call received by the electronic device to the second electronic device based on the third connection while the electronic device receives the audio data on the call received by the first electronic device based on the second connection.

8. The method of claim 7, wherein the first connection comprises a first Hands-Free Profile (HFP) connection, and wherein the second connection comprises a second Hands-Free Profile (HFP) connection using a Hands-Free unit (HF) of the electronic device and an Audio Gateway (AG) of the first electronic device, and
wherein the establishing the third connection comprises establishing a third Hands-Free Profile (HFP) connection using an Audio Gateway (AG) of the electronic device and the Hands-Free unit (HF) of the second electronic device.

9. The method of claim 8, wherein the receiving of the audio data on the call received by the first electronic device from the first electronic device based on the second connection comprises:
connecting to a second SCO link based on the second HFP connection; and
receiving the audio data on the call received by the first electronic device from the first electronic device through the second SCO link.

10. The method of claim 9, wherein the transmitting of the audio data on the call received by the electronic device to a third electronic device while receiving the audio data on the call received by the first electronic device from the first electronic device comprises:
terminating the connection of the second SCO link;
connecting to a third Synchronous Connection Oriented (SCO) link based on the third HFP connection; and
transmitting the audio data on the call received by the electronic device to the second electronic device through the third SCO link.

11. An electronic device comprising:
a communication module;
an Audio Gateway (AG) service module;
a Hands-Free Profile (HFP) service module;
a processor electrically connected to the communication module, the AG service module, and the HFP service module; and
a memory,
wherein the memory stores instructions, that when executed by the processor, cause the electronic device to establish a first connection to a first electronic device, to transmit audio data on a call received, based on a first call connection request from a first base station, by the electronic device to the first electronic device based on the first connection, and to receive audio data on a call received, based on a second call connection request from a second base station, by the first electronic device based on a second connection in a state where the electronic device and the first electronic device are connected through the first connection.

12. The electronic device of claim 11, wherein the first connection and the second connection are short-range wireless communication connections.

13. The electronic device of claim 11, wherein the memory stores instructions, that when executed by the processor, cause the electronic device to establish a first HFP connection using the AG of the electronic device and a Hands-Free unit (HF) of the first electronic device in a case where the electronic device establishes the first connection.

14. The electronic device of claim 13, wherein the memory stores instructions, that when executed by the processor, cause the electronic device to establish a second Hands-Free Profile (HFP) connection using the Hands-Free unit (HF) of the electronic device and the Audio Gateway (AG) of the first electronic device in the case where the electronic device establishes the second connection.

15. The electronic device of claim 14, wherein the memory stores instructions, that when executed by the processor, cause the electronic device to connect to a first Synchronous Connection Oriented (SCO) link based on the first HFP connection and to transmit the audio data on the call received by the electronic device to the first electronic device through the first SCO link in a case where the electronic device transmits the audio data on the call received by the electronic device to the first electronic device based on the first connection.

16. The electronic device of claim 15, wherein the memory stores instructions, that when executed by the processor, cause the electronic device to terminate the connection of the first SCO link, to connect to a second SCO link based on the second HFP connection, and to receive the audio data on the call received by the first electronic device from the first electronic device through the second SCO link in a case where the electronic device receives the audio data on the call received by the first electronic device based on the second connection.

17. The electronic device of claim 11, wherein the memory stores instructions, that when executed by the processor, cause the electronic device to establish a third connection to a second electronic device, and to transmit the audio data on the call received by the electronic device to the second electronic device based on the third connection while the electronic device receives the audio data on the call received by the first electronic device based on the second connection.

18. The electronic device of claim 17, wherein the first connection comprises a first HFP connection, and wherein the memory stores instructions, that when executed by the processor, cause the electronic device to establish a second HFP connection using a Hands-Free unit (HF) of the electronic device and the AG of the first electronic device in the case where the electronic device establish the second connection, and to establish a third HFP connection using the AG of the electronic device and a Hands-Free unit (HF) of the second electronic device in a case where the electronic device makes the third connection.

19. The electronic device of claim 18, wherein the memory stores instructions, that when executed by the processor, cause the electronic device to connect to a second SCO link based on the second HFP connection and to receive the audio data on the call received by the first electronic device from the first electronic device through the second SCO link in the case where the electronic device receives the audio data on the call received by the first electronic device from the first electronic device based on the second connection.

20. The electronic device of claim 19, wherein the memory stores instructions, that when executed by the processor, cause the electronic device to terminate the connection of the second SCO link, to connect to a third Synchronous Connection Oriented (SCO) link based on the third HFP connection, and to transmit the audio data on the call received by the electronic device to the second electronic device through the third SCO link in a case where the electronic device transmits the audio data on the call received by the electronic device to a third electronic device while receiving the audio data on the call received by the first electronic device from the first electronic device.

* * * * *